US010411509B2

(12) United States Patent
Graham

(10) Patent No.: US 10,411,509 B2
(45) Date of Patent: Sep. 10, 2019

(54) TESSELLATED INDUCTIVE POWER TRANSMISSION SYSTEM COIL CONFIGURATIONS

(71) Applicant: Apple Inc., Cupertino, CA (US)

(72) Inventor: Christopher S. Graham, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 15/436,264

(22) Filed: Feb. 17, 2017

(65) Prior Publication Data
US 2017/0163092 A1 Jun. 8, 2017

Related U.S. Application Data

(63) Continuation of application No. 14/225,067, filed on Mar. 25, 2014, now Pat. No. 9,601,933.

(51) Int. Cl.
*H01F 38/14* (2006.01)
*H02J 50/10* (2016.01)
(Continued)

(52) U.S. Cl.
CPC ............ *H02J 50/10* (2016.02); *H02J 7/0042* (2013.01); *H02J 7/025* (2013.01); *H02J 17/00* (2013.01);
(Continued)

(58) Field of Classification Search
None
See application file for complete search history.

(56) References Cited

U.S. PATENT DOCUMENTS 2,471,869 A    5/1949  Gebel, et al.
3,676,814 A    7/1972  Floyd et al.
(Continued)

FOREIGN PATENT DOCUMENTS

EP    642203    3/1995
EP    886363    12/1998
(Continued)

OTHER PUBLICATIONS

"System Description Wireless Power Transfer", Wireless Power Consortium, vol. 1: Lower Power, Part 1: Interface Definition, Version 1.1.2, Jun. 2013, 186 pages.
(Continued)

*Primary Examiner* — Alfonso Perez Borroto
*Assistant Examiner* — Esayas G Yeshaw
(74) *Attorney, Agent, or Firm* — Kilpatrick Townsend & Stockton LLP

(57) ABSTRACT

A system for inductive power transmission includes at least one interface surface and a plurality of triangular coil elements positioned underneath the interface surface such that at least one edge of the respective triangular coil element is adjacent to an edge of at least one other of the triangular coil elements. Each of the triangular coil elements may be operable to inductively transmit power to at least one coil of at least one electronic device and/or inductively receive power from the coil of the electronic device. Each triangular coil element may be operable to detect the proximity of one or more inductive coils of one or more electronic devices and inductively transmit power upon such detection at different frequencies, power levels, and/or other inductive power transmission characteristics.

24 Claims, 10 Drawing Sheets

(51) Int. Cl.
  *H02J 50/70* (2016.01)
  *H02J 50/40* (2016.01)
  *H02J 7/02* (2016.01)
  *H02J 50/90* (2016.01)
  *H02J 7/00* (2006.01)
  *H02J 17/00* (2006.01)
  *H02J 50/00* (2016.01)

(52) U.S. Cl.
  CPC .............. *H02J 50/40* (2016.02); *H02J 50/70* (2016.02); *H02J 50/90* (2016.02); *H02J 50/00* (2016.02); *Y10T 307/406* (2015.04)

(56) References Cited

U.S. PATENT DOCUMENTS

| | | |
|---|---|---|
| 4,496,927 A | 1/1985 | Inoue et al. |
| 4,529,906 A | 7/1985 | McMahon et al. |
| 5,903,134 A | 5/1999 | Takeuchi et al. |
| 6,643,913 B2 | 11/2003 | Anbo et al. |
| 6,798,039 B1 | 9/2004 | Gillespie et al. |
| 6,798,326 B2 | 9/2004 | Iida et al. |
| 6,803,744 B1 | 10/2004 | Sabo et al. |
| 6,922,128 B2 | 7/2005 | Hyvonen et al. |
| 7,164,255 B2 * | 1/2007 | Hui ..................... H01F 17/0006 320/108 |
| 7,432,793 B2 | 10/2008 | Nussbaum et al. |
| 7,839,120 B2 | 11/2010 | Elizalde |
| 7,872,559 B2 | 1/2011 | Asano et al. |
| 7,902,953 B1 | 3/2011 | Watt et al. |
| 8,049,370 B2 | 11/2011 | Ben-Shalom et al. |
| 8,159,183 B2 | 4/2012 | Choi et al. |
| 8,169,185 B2 | 5/2012 | Partovi et al. |
| 8,193,889 B2 | 6/2012 | Pyrhönen et al. |
| 8,253,486 B2 | 8/2012 | Kim et al. |
| 8,354,821 B2 | 1/2013 | Cheng et al. |
| 8,354,910 B2 | 1/2013 | Park et al. |
| 8,456,038 B2 | 6/2013 | Ben-Shalom et al. |
| 8,587,154 B2 | 11/2013 | Fells et al. |
| 8,692,639 B2 | 4/2014 | Baarman et al. |
| 8,766,488 B2 | 7/2014 | Ben-Shalom et al. |
| 8,823,238 B2 | 9/2014 | Greaves et al. |
| 9,166,440 B2 | 10/2015 | Ben-shalom et al. |
| 9,178,369 B2 | 11/2015 | Partovi |
| 9,209,627 B2 | 12/2015 | Baarman |
| 9,231,411 B2 | 1/2016 | Taylor et al. |
| 9,356,473 B2 | 5/2016 | Ghovanloo |
| 9,424,983 B2 | 8/2016 | Choi et al. |
| 9,461,501 B2 * | 10/2016 | Partovi ................. H02J 7/0027 |
| 2009/0001941 A1 * | 1/2009 | Hsu ....................... H02J 7/0044 323/211 |
| 2011/0163608 A1 * | 7/2011 | Brohlin ................... H02J 5/005 307/104 |
| 2011/0164471 A1 * | 7/2011 | Baarman ................. H02J 7/025 368/10 |
| 2012/0161539 A1 * | 6/2012 | Kim ........................ H02J 17/00 307/104 |
| 2012/0202435 A1 * | 8/2012 | Kim ..................... H04B 5/0037 455/69 |
| 2012/0293007 A1 * | 11/2012 | Byun ...................... H02J 17/00 307/104 |
| 2012/0294045 A1 * | 11/2012 | Fornage ................ H02M 7/217 363/17 |
| 2013/0049484 A1 | 2/2013 | Weissentern et al. |
| 2013/0063085 A1 * | 3/2013 | Takada .................. B60L 11/182 320/108 |
| 2013/0099591 A1 * | 4/2013 | Yeo ...................... H02M 3/3376 307/104 |
| 2014/0091756 A1 | 4/2014 | Ofstein et al. |
| 2015/0171820 A1 * | 6/2015 | Koike ..................... H02J 5/005 320/109 |
| 2015/0280442 A1 | 10/2015 | Graham |
| 2015/0303699 A1 | 10/2015 | Wagman et al. |
| 2015/0303742 A1 * | 10/2015 | Matsumoto ............. H02J 17/00 307/104 |
| 2015/0348697 A1 | 12/2015 | Brzezinski et al. |
| 2016/0006288 A1 | 1/2016 | Wagman et al. |
| 2016/0118179 A1 | 4/2016 | Lee et al. |

FOREIGN PATENT DOCUMENTS

| | | |
|---|---|---|
| EP | 2161811 | 3/2010 |
| EP | 2674950 | 12/2013 |
| WO | 9217929 | 10/1992 |
| WO | 9823020 | 5/1998 |
| WO | 2003096361 | 11/2003 |
| WO | 2004073283 | 8/2004 |
| WO | 2005036569 | 4/2005 |
| WO | 2010129369 | 11/2010 |

OTHER PUBLICATIONS

Palany, "Power Losses in Litz Wire Used in IPT Applications," Department of Electrical and Computer Engineering, University of Auckland, Aukland, New Zealand, May 30, 2014, 9 pages.

"Non-Final Office Action" dated Jun. 22, 2016 in U.S. Appl. No. 14/225,067. 12 pages.

"Notice of Allowance" dated Nov. 9, 2016 in U.S. Appl. No. 14/225,067. 5 pages.

* cited by examiner

TESSELLATED INDUCTIVE POWER TRANSMISSION SYSTEM COIL CONFIGURATIONS

CROSS-REFERENCES TO RELATED APPLICATIONS

This application is a continuation of U.S. patent application Ser. No. 14/225,067, filed Mar. 25, 2014, which is herein incorporated by reference in its entirety for all purposes.

TECHNICAL FIELD

This disclosure relates generally to inductive power transmission, and more specifically to tessellated inductive power transmission coil configurations capable of charging multiple devices utilizing complex areas.

BACKGROUND

Induction may be utilized to wirelessly transmit power between electronic devices. Such wireless power transmission may be performed for the purposes of powering one or more devices, charging one or more batteries, an/or other such purposes.

Inductive charging devices, such as a charging pad or dock, may include an inductive power transmission system coil that is used to transmit power to an electronic device proximate to the inductive charging device. In cases where the inductive charging device has a single inductive power transmission system coil, the inductive charging device may only be able to transmit power to a single electronic device at a time. In order to transmit power to another electronic device, the electronic device currently proximate to the inductive charging device may have to be swapped out for the other device.

In some cases, inductive charging devices may have multiple inductive power transmission system coils. In such cases, the number of coils that can be included (and thus the number of different electronic devices to which a single inductive charging device may transmit power) may be limited by coil geometry, cross coupling and/or other interference between the coils, and/or other such considerations.

SUMMARY

The present disclosure discloses systems, apparatuses, and methods for inductive power transmission. A system for inductive power transmission may include at least one interface surface and a plurality of triangular coil elements positioned underneath the interface surface such that at least one edge of the respective triangular coil element is adjacent to an edge of at least one other of the triangular coil elements. Each of the triangular coil elements may be operable to inductively transmit power to at least one coil of at least one electronic device and/or inductively receive power from the coil of the electronic device.

Each of the triangular coil elements may be operable to inductively transmit and/or receive power independently. Each triangular coil element may be operable to detect the proximity of one or more inductive coils of one or more electronic devices and inductively transmit power upon such detection. Each triangular coil element may be operable to inductively transmit power at different frequencies, power levels, and/or other inductive power transmission characteristics and may be capable of adjusting transmission to the requirements of one or more receiving devices. Multiple of the triangular coil elements may be operable to inductively transmit power at the same time and/or at the same time that other triangular coil elements are inductively receiving power. In cases where two triangular coil elements are inductively transmitting power at the same time, each may transmit at different frequencies, power levels, and so on.

Multiple of the triangular coil elements may be operable to inductively transmit and/or receive power cooperatively. For example, multiple triangular coil elements may detect proximity to the same inductive coil of an electronic device and/or inductive coils of the same electronic device (such as by monitoring current of the triangular coil elements, monitoring information exchanged between the electronic device and an electronic device incorporating the triangular coil elements whether exchanged utilizing the triangular coil elements and/or other communication components, and so on). In such a case, the inductive power characteristics of the triangular coil elements may be adjusted such that the triangular coil elements inductively transmit and/or receive power cooperatively, such as utilizing matching inductive transmission parameters, complementary inductive transmission parameters, and so on. Such adjustment may synchronize the triangular coil elements, intelligently cancel each other, and so on.

Although the coil elements are discussed herein as triangular, it is understood that this is an example. In various implementations, the coil elements may be one or more different shapes (such as rectangles, triangles other than equilateral triangles, hexagons, circles, ovals, squares, irregular shapes, other shapes, and/or a mixture of shapes) without departing from the scope of the present disclosure.

Further, although the coil elements are discussed herein as flat coil elements, it is understood that this is an example. In various implementations, the coil elements may be nonflat, such as curved (such as to follow the curve of a curved interface surface), bent, stepped, angled, and/or otherwise configured in a non-planar manner.

In some implementations, the interface surface may have a regular horizontal shape. However, in other implementations the interface surface may have an irregular shape and the area underneath the interface surface may still be maximized due to the triangular nature of the triangular coil elements. Additionally, in various implementations the interface surface may be a planar surface. However, in other implementations the interface surface may be non-planar. In such implementations, one or more of the triangular coil elements may occupy a different horizontal plane.

The triangular coil elements may be formed in a variety of ways. Such triangular coil elements may be wound wire, printed circuit boards, flexible printed circuits, etches circuits, and or other such formed inductive coils. Each of the triangular coil elements may include one or more shielding elements formed of one or more ferrite materials. Such ferrite shielding elements may separate adjacent triangular coil elements and/or shield a surface of the triangular coil elements opposite the interface surface.

In a first embodiment, a system for inductive power transmission includes at least one interface surface and a plurality of triangular coil elements positioned underneath the at least one interface surface. Each of the plurality of triangular coil elements may be positioned such that at least one edge of the respective triangular coil element is adjacent to an edge of at least one other of the plurality of triangular coil elements. Each of the plurality of triangular coil elements are operable to inductively transmit power to at least one coil of at least one electronic device or inductively receive power from the at least one coil of the at least one electronic device.

In a second embodiment, an electronic device includes at least one interface surface and a plurality of triangular coil elements positioned underneath the at least one interface surface. Each of the plurality of triangular coil elements may be positioned such that at least one edge of the respective triangular coil element is adjacent to an edge of at least one other of the plurality of triangular coil elements. Each of the plurality of triangular coil elements are operable to inductively transmit power to at least one coil of at least one electronic device or inductively receive power from the at least one coil of the at least one electronic device.

In a third embodiment, a method for inductive power transmission includes: placing at least one electronic device on an interface surface of an inductive power transmission device, the inductive power transmission device including a plurality of triangular coil elements positioned underneath the interface surface, each of the plurality of triangular coil elements positioned such that at least one edge of the respective triangular coil element is adjacent to an edge of at least one other of the plurality of triangular coil elements; detecting that at least one of the plurality of triangular coil elements is proximate to the at least one electronic device; and inductively transmitting power to the at least one electronic device utilizing the at least one of the plurality of triangular coil elements.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE INVENTION

Figure 1A:
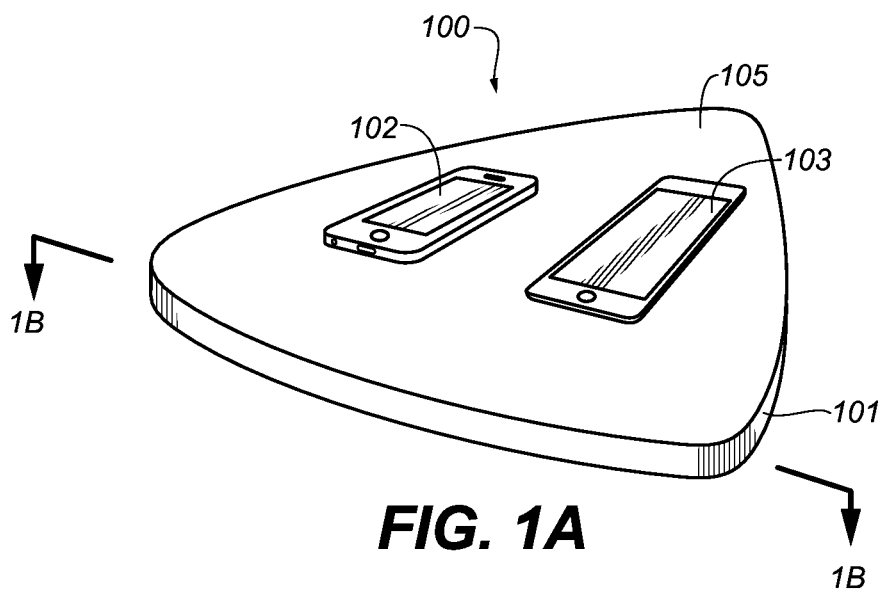
FIG. 1A is an isometric view diagram illustrating a first example system for inductive power transmission.

The description that follows includes sample systems, methods, and computer program products that embody various elements of the present disclosure. However, it should be understood that the described disclosure may be practiced in a variety of forms in addition to those described herein.

The present disclosure discloses systems, apparatuses, and methods for inductive power transmission. A system for inductive power transmission may include at least one interface surface and a plurality of triangular coil elements, which may be equilateral triangles, positioned underneath the interface surface. Each of the triangular coil elements may be positioned such that at least one edge of the respective triangular coil element is adjacent to an edge of at least one other of the triangular coil elements. In some cases, at least one of the triangular coil elements may be positioned such that each of its edges are adjacent to edges of other triangular coil elements. Each of the triangular coil elements may be operable to inductively transmit power to at least one coil of one or more electronic devices and/or inductively receive power from the coil of the electronic device. In this way, the triangular coil elements may be positioned to maximize the area underneath the interface surface.

In some implementations, the interface surface may have a regular horizontal shape, such as a square, rectangle, hexagon, and so on. However, in other implementations the interface surface may have an irregular shape and the area underneath the interface surface may still be maximized due to the triangular nature of the triangular coil elements.

Additionally, in various implementations the interface surface may be a planar surface. However, in other implementations the interface surface may be a non-planar surface. In such implementations, one or more of the triangular coil elements may occupy a different horizontal plane. For example, one or more triangular coil elements may be angularly offset in a Z-axis with respect to an adjacent triangular coil element. In some cases of such implementations, none of the triangular elements may share a horizontal plane.

Each of the triangular coil elements may be operable to inductively transmit and/or receive power independently. Each triangular coil element may be operable to detect the proximity of one or more inductive coils of one or more electronic devices and inductively transmit power upon such detection.

Each triangular coil element may be operable to inductively transmit power at different frequencies, power levels, and/or other inductive power transmission characteristics and may be capable of adjusting transmission to the requirements of one or more receiving devices. Multiple of the triangular coil elements may be operable to inductively transmit power at the same time and/or at the same time that other triangular coil elements are inductively receiving power. In cases where two triangular coil elements are inductively transmitting power at the same time, each may transmit at different frequencies, power levels, and so on in order to mitigate, minimize, and/or eliminate cross coupling and/or other interference between the transmitting triangular coil elements.

Multiple of the triangular coil elements may be operable to inductively transmit and/or receive power cooperatively. For example, multiple triangular coil elements may detect proximity to the same inductive coil of an electronic device and/or inductive coils of the same electronic device (such as by monitoring current of the triangular coil elements, monitoring information exchanged between the electronic device and an electronic device incorporating the triangular coil elements whether exchanged utilizing the triangular coil elements and/or other communication components, and so on). In such a case, the inductive power characteristics of the triangular coil elements may be adjusted such that the triangular coil elements inductively transmit and/or receive power cooperatively, such as utilizing matching parameters, complementary parameters, and so on. Such adjustment may synchronize the triangular coil elements, intelligently cancel each other, and so on.

Although the coil elements are discussed herein as triangular, it is understood that this is an example. In various implementations, the coil elements may be one or more different shapes (such as rectangles, triangles other than equilateral triangles, hexagons, circles, ovals, squares, irregular shapes, other shapes, and/or a mixture of shapes) without departing from the scope of the present disclosure.

Further, although the coil elements are discussed herein as flat coil elements, it is understood that this is an example. In various implementations, the coil elements may be non-flat, such as curved (such as to follow the curve of a curved interface surface), bent, stepped, angled, and/or otherwise configured in a non-planar manner.

The triangular coil elements may be formed in a variety of ways. Such triangular coil elements may be wound wire (for example, wound on a mandrel), printed circuit boards, flexible printed circuits, etches circuits, and or other such formed inductive coils.

Each of the triangular coil elements may include one or more shielding elements. Such shielding elements may be formed of one or more ferrite materials and may separate adjacent triangular coil elements. Further, such shielding elements may shield a surface of the triangular coil elements opposite the interface surface. These shielding elements may reduce, mitigate, and/or eliminate cross coupling and/or other interference between triangular coil elements and/or may assist and/or otherwise improve inductive power transfer between triangular coil elements and other coil elements of other electronic devices.

FIG. 1A is an isometric view diagram illustrating a first example system 100 for inductive power transmission. As illustrated, the system includes an electronic device 101 (e.g., a charging pad) operable to inductively transmit power to a number of other electronic devices proximate to an interface surface 105 such as electronic device 102 and electronic device 103. However, it is understood that this is an example. In various implementations, the electronic device 101 may be any kind of electronic device operable to inductively transmit power to and/or inductively receive power from any number of electronic device such as a laptop computer, a desktop computer, a mobile computer, a tablet computer, a cellular telephone, a smart phone, a digital media player, a dock, a wearable device, a display device, and/or any other electronic device.

Further, although the electronic device 102 is illustrated as a smart phone and electronic device 103 is illustrated as a digital media player, it is understood that these are examples and the electronic devices 102 and/or 103 may be any kind of electronic device operable to inductively transmit power to and/or inductively receive power from any number of electronic devices such as those listed above.

As illustrated, the interface surface 105 may have an irregular horizontal shape. However, it is understood that this is an example. In various implementations, the interface surface may have a regular horizontal shape such as a rectangle, a square, and/or any other regular shape. As further illustrated, the interface surface may be a planar surface. However, it is understood that this is an example. In other implementations, the interface surface may be a non-planar surface (such as in the second example system 200 shown in FIG. 2A).

Figure 1B:
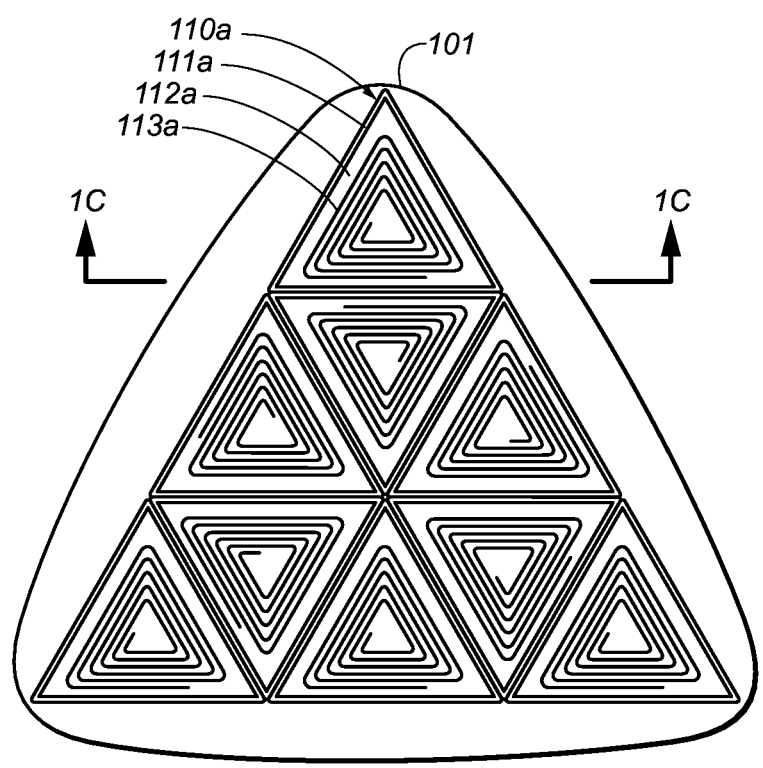
FIG. 1B is a cross section of the electronic device of FIG. 1A, taken along line 1B-1B of FIG. 1.

FIG. 1B is a cross section of the electronic device 101 of FIG. 1A, taken along line 1B-1B of FIG. 1. As illustrated, a number of inductive transmission triangular coil elements 110a (which may be equilateral triangles as illustrated and/or may be any kind of triangle and/or a combination of different types of triangles) may be positioned underneath the interface surface 105. The triangular coil elements may be positioned edge to edge such that at least one edge of each is adjacent to the edge of another. As illustrated, one or more triangular coil elements may be positioned such that each edge is adjacent to the edge of at least one other triangular coil element. As illustrated, the triangular coil elements may be positioned to maximize an area underneath the interface surface 105 to maximize the number of coil elements positioned within the area.

Each of the triangular coil elements 110a may be operable to inductively transmit power to and/or inductively receive power from one or more coils of one or more other electronic devices, such as the electronic devices 102 and 103. The triangular coil elements may be independently operable. Each may be operable to inductively transmit power at different frequencies, power levels, and/or other inductive power transmission characteristics. In some implementations, each may be capable of adjusting transmission to the requirements of one or more receiving devices, such as the electronic devices 102 and 103.

Multiple of the triangular coil elements 110a may be operable to inductively transmit power at the same time and/or at the same time that other triangular coil elements are inductively receiving power. In cases where two triangular coil elements are inductively transmitting power at the same time, each may transmit at different frequencies, power levels, and so on in order to mitigate, minimize, and/or eliminate cross coupling and/or other interference between the transmitting triangular coil elements.

Each of the triangular coil elements 110a may be operable to inductively transmit and/or receive power independently. Each triangular coil element may be operable to detect the proximity of one or more inductive coils of one or more electronic devices (such as the electronic devices 102 and 103) and inductively transmit power upon such detection. For example, such detection may be performed by monitoring current of the triangular coil elements, monitoring information exchanged between the electronic device and an electronic device incorporating the triangular coil elements whether exchanged utilizing the triangular coil elements and/or other communication components, and so on. This selective activation based upon detection of proximity may utilize less power than activation that is not based upon detection of proximity.

In some cases, multiple triangular coil elements 110a may be in proximity with one or more inductive coils of one or more electronic devices (such as the electronic devices 102 and 103), such as when an electronic device is positioned proximate to portions such as the illustrated portions where the points of multiple triangular coil elements meet. In such a case, the electronic device 101 may alternate which of the proximate triangular coil elements are utilized to inductively transmit and/or receive power according to any number of different alternation schemes. For example, an electronic device may be positioned proximate to portions where three triangular coil elements meet. In such an example, a first of the three may be utilized to inductively transmit and/or receive power. Then, the first of the three may be deactivated and a second of the three may be activated. Subsequently, the second may be deactivated and the third may be activated. Such alternation between utilization of different triangular coil elements may reduce, mitigate, prevent, and/or dissipate heat caused by inductive transmission. Further, such alternation may further mitigate, minimize, and/or eliminate cross coupling and/or other interference between the transmitting triangular coil elements.

Additionally, multiple of the triangular coil elements 110a may be operable to inductively transmit and/or receive power cooperatively. For example, multiple triangular coil elements may detect proximity to the same inductive coil of an electronic device and/or inductive coils of the same electronic device. In such a case, the inductive power characteristics of the triangular coil elements may be adjusted such that the triangular coil elements inductively transmit and/or receive power cooperatively, such as utilizing matching parameters, complementary parameters, and so on. Such adjustment may synchronize the triangular coil elements, intelligently cancel each other, and so on.

As illustrated, one or more of the triangular coil elements 110a may share a horizontal plane. However, it is understood that this is an example. In various implementations, one or more triangular elements may occupy different horizontal planes (see the second example implementation 200 illustrated in FIG. 2B). In some implementations, all of the triangular elements may occupy different horizontal planes.

As illustrated, the triangular coil elements 110a may include wound wire coils 113a. However, it is understood that this is an example. In various implementations, the triangular coil elements may be formed in a variety of ways. Such triangular coil elements may be wound wire, printed circuit boards, flexible printed circuits, etches circuits, and or other such formed inductive coils.

Each of the triangular coil elements 110a may include one or more shielding elements 111a and 112a. Such shielding elements may be formed of one or more ferrite materials. As illustrated, shield elements 111a separate adjacent triangular coil elements and shield elements 112a shield a surface of the triangular coil elements opposite the interface surface. These shielding elements may reduce, mitigate, and/or eliminate cross coupling and/or other interference between triangular coil elements. These shielding elements may also assist and/or otherwise improve inductive power transfer between triangular coil elements and other coil elements of other electronic devices (such as the electronic devices 102 and 103) by focusing the inductive power transferred, preventing other triangular coil elements from unintendedly receiving transferred power, reducing eddy currents in other triangular coil elements that dissipate transferred power by way of thermal losses, and so on.

Figure 1C:
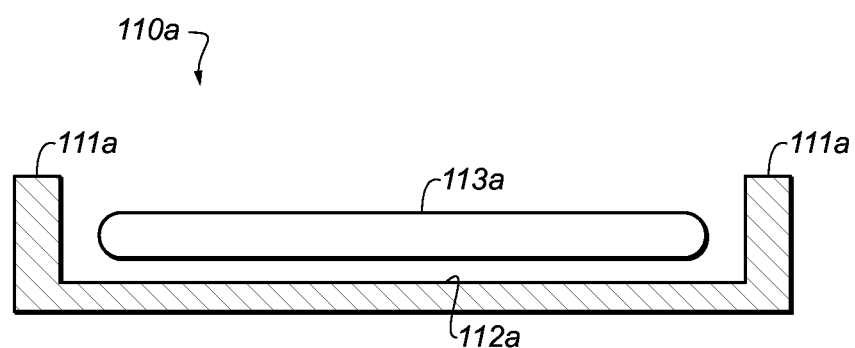
FIG. 1C is a cross section of a triangular coil element of FIG. 1B, taken along line 1C-1C of FIG. 1B.

FIG. 1C is a cross section of a triangular coil element 110a of FIG. 1B, taken along line 1C-1C of FIG. 1B showing the positioning of the shield elements 111a and the shield elements 112a around the sides and bottom, respectively, of the wound wire coil 113a of the triangular coil element 110a.

Although the coil elements 110a are discussed herein and illustrated in FIG. 1B as triangular, it is understood that this is an example. In various implementations, the coil elements may be one or more different shapes (such as rectangles, triangles other than equilateral triangles, hexagons, circles, ovals, squares, irregular shapes, other shapes, and/or a mixture of shapes) without departing from the scope of the present disclosure. Such different shapes may be selected for a variety of different considerations such as optimizing space, power transmission characteristics, and/or other characteristics. For example, different shapes may be utilized in order to create areas of higher power transmission density and lower transmission density. Though shapes other than triangles are discussed with respect to this first example system 100, it is understood that various shapes may be utilized in any of the embodiments discussed herein without departing from the scope of the present disclosure.

Figure 1D:
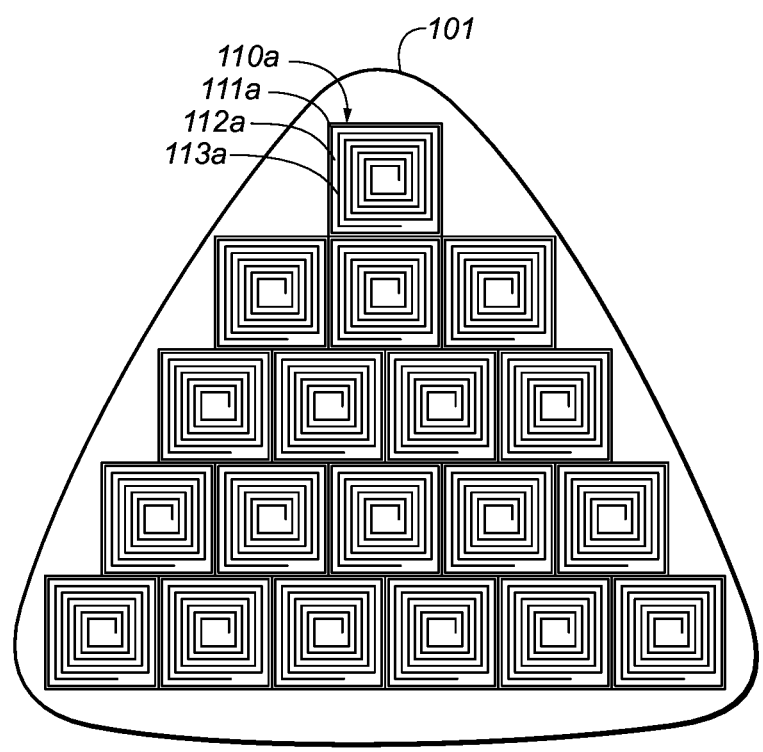
FIG. 1D illustrates an example of a first alternative implementation of the electronic device shown in FIG. 1B.
Figure 1E:
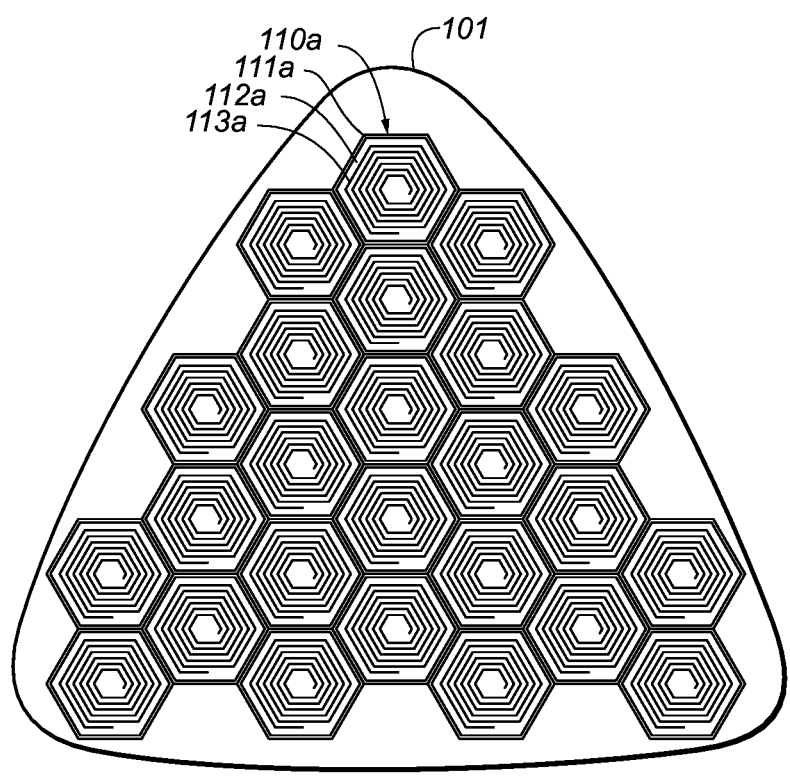
FIG. 1E illustrates an example of a second alternative implementation of the electronic device shown in FIG. 1B.
Figure 1F:
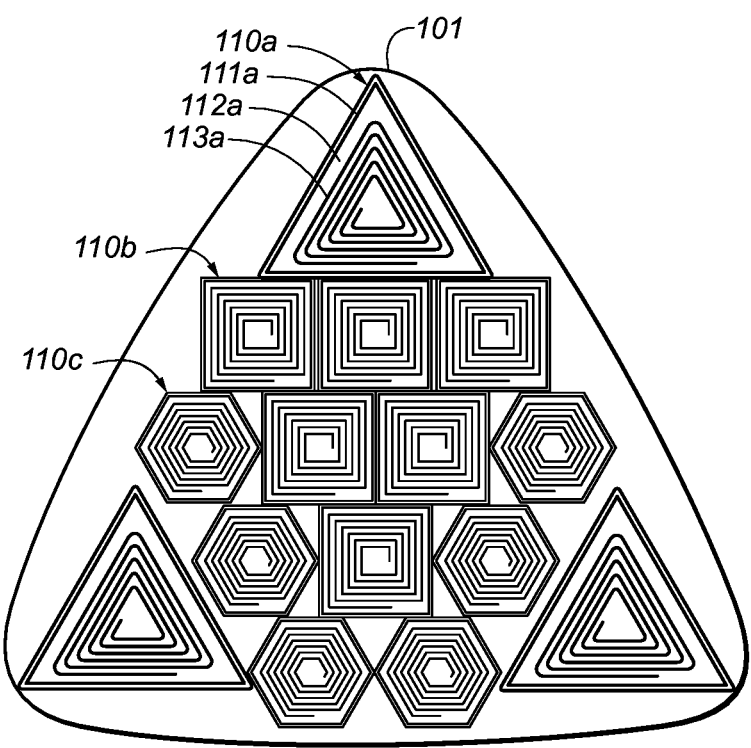
FIG. 1F illustrates an example of a third alternative implementation of the electronic device shown in FIG. 1B.
Figure 2A:
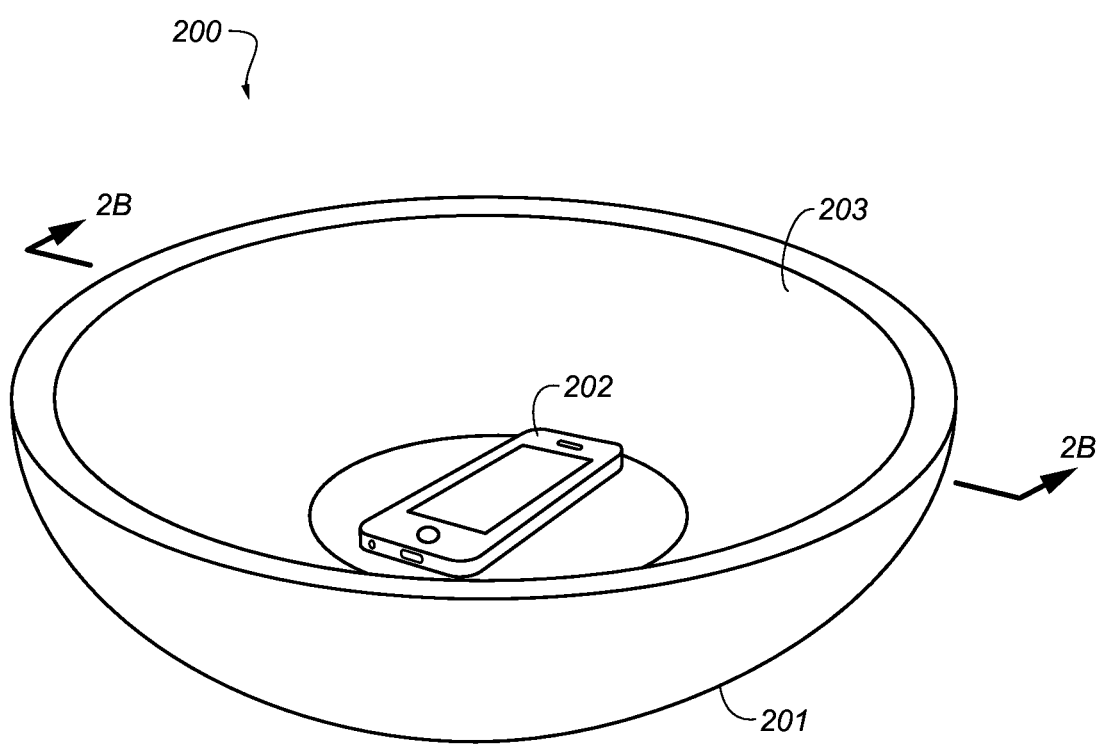
FIG. 2A is an isometric view diagram illustrating a second example system for inductive power transmission.

For example, FIG. 1D illustrates an example of a first alternative implementation of the electronic device 101 shown in FIG. 1B where coil elements 110a are square. FIG. 1E illustrates an example of a second alternative implementation of the electronic device shown in FIG. 1B where coil elements 110a are hexagonal. FIG. 1F illustrates an example of a third alternative implementation of the electronic device shown in FIG. 1B where coil elements 110a-110c are a mix of different shapes. FIG. 2A is an isometric view diagram illustrating a second example system 200 for inductive power transmission. As illustrated, the system includes an electronic device 201 that is a charging bowl operable to inductively transmit power to a number of electronic devices proximate to an interface surface 203 such as electronic device 202. However, it is understood that this is an example. In various implementations, the electronic device 201 may be any kind of electronic device operable to inductively transmit power to and/or inductively receive power from any number of electronic device. Further, although the electronic device 202 is shown as a smart phone, it is understood that this is an example. In various implementations, the electronic device 202 may be any kind of electronic device.

Figure 2B:
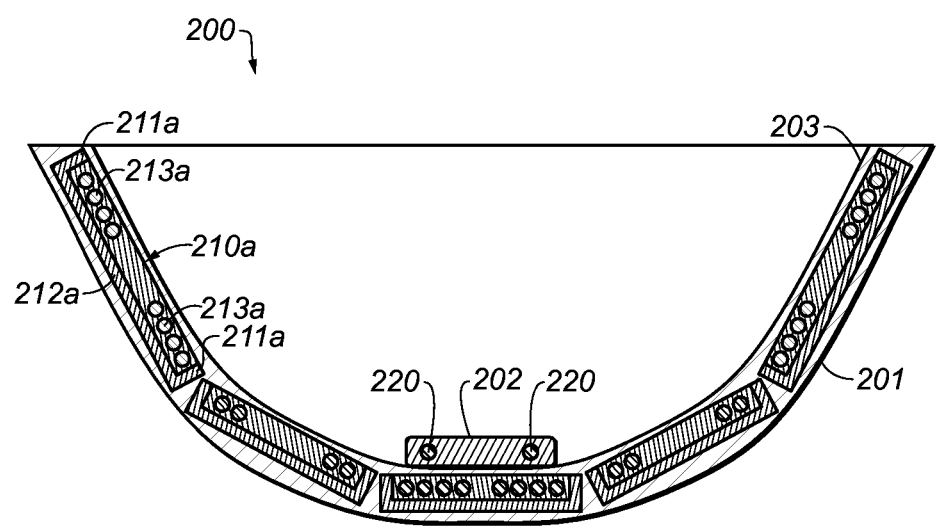
FIG. 2B is a cross section of the second example system of FIG. 2A, taken along line 2B-2B of FIG. 1.

As illustrated, the interface surface 203 may be non-planar. FIG. 2B is a cross section of the second example system 200 of FIG. 2A, taken along line 2B-2B of FIG. 1. Similar to the first example system 100 of FIGS. 1A-1C, the second example system 200 includes a number of triangular coil elements 210a including coils 213a and shield elements 211a and 212a independently operable to inductively transmit power to and/or receive power from one or more electronic devices (such as to and/or from the inductive coil 220 of the second electronic device 202). However, unlike the first example system 100, none of the triangular coil elements 210a share a horizontal plane.

As such, a user may drop, toss, or otherwise place electronic devices (such as the electronic device 202) into the bowl shaped electronic device 201 in order to initiate power transmission. As the triangular coil elements 210a may detect proximity of such electronic devices prior to transmission, other objects may be placed into the bowl shaped electronic device 201 without initiating transmission in areas proximate to such other objects, preventing transmission from affecting such other objects or such other objects from interfering with transmission.

Further, although the first example system 100 is a planar surface with triangular coil elements 110a all occupying a single horizontal plane and the second example system 200 is a non-planar curved surface where none of triangular coil elements 210a occupy the same horizontal plane (having a series of planes in which the triangular coil elements 210a are angularly offset in planes from each other to follow the shape of the curve), it is understood that other geometries are possible. For example, in various implementations some but not all triangular coil elements may occupy the same horizontal plane. Some surfaces may house multiple triangular coil elements that occupy the same plane whereas others house only a single triangular coil element occupying a single plane, which may depend on the size of the surface.

Figure 2C:
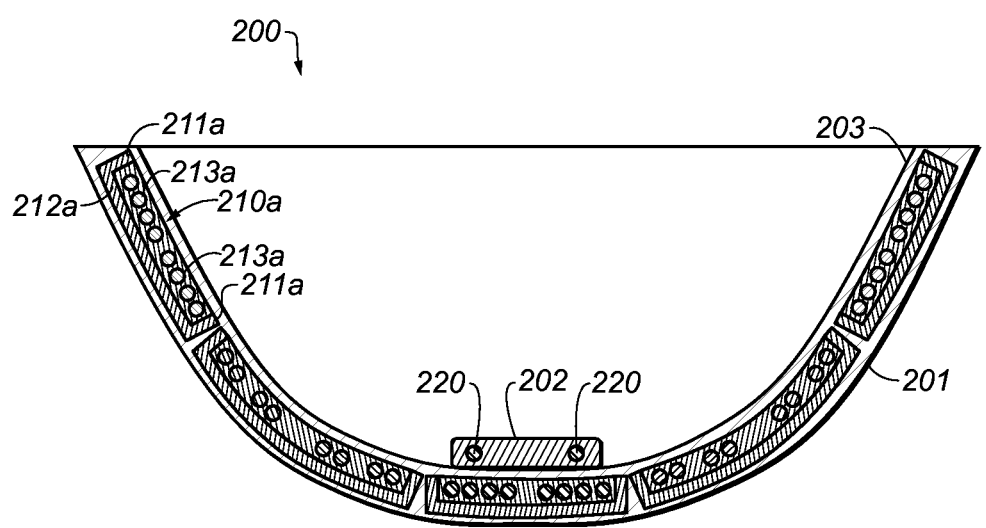
FIG. 2C illustrates an example of an alternative implementation of the electronic device shown in FIG. 2B.

Additionally, although the coil elements 210a-210e are discussed herein and illustrated in FIG. 2B as flat coil elements, it is understood that this is an example. In various implementations, the coil elements may be non-flat or otherwise non-planar, such as curved (such as to follow the curve of a curved interface surface), bent, stepped, angled, and/or otherwise configured in a non-planar manner. The coil-elements may be configured as nonplanar for a variety of considerations, such as to conform to a non-planar interface surface, to enable different power transmission characteristics or profiles, and so on. For example, FIG. 2C illustrates an example of an alternative implementation of the electronic device shown in FIG. 2B where certain coil elements 210a are individually curved to correspond to the non-planar curved surface of the interface surface 203. Though non-planar coil elements are discussed with respect to this second example system 200, it is understood that various shapes may be utilized in any of the embodiments discussed herein without departing from the scope of the present disclosure. Likewise, certain embodiments may use both planar and non-planar coils in their design and implementation.

Figure 3:
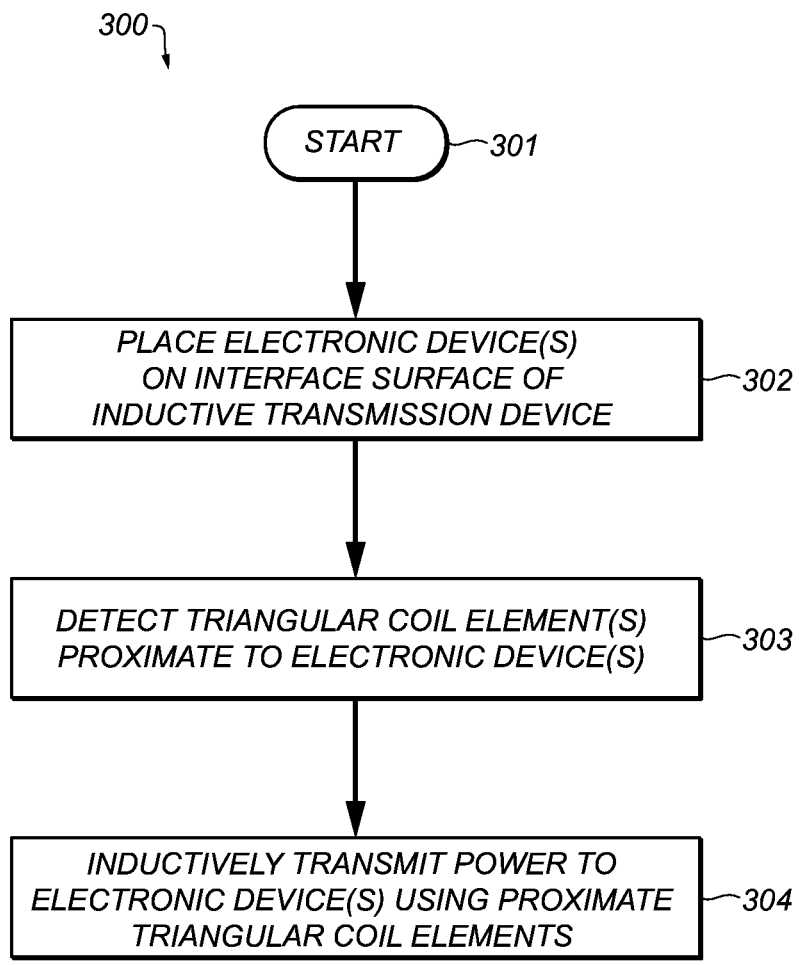
FIG. 3 is a flow chart illustrating an example method for inductive power transmission. This method may be performed by the systems of FIGS. 1A-1C and/or 2A-2B.

FIG. 3 is a flow chart illustrating an example method for inductive power transmission. This method may be performed by the systems of FIGS. 1A-1C and/or 2A-2B.

The flow begins at block 301 and proceeds to block 302 where one or more electronic devices are placed on an interface surface of a device such as an inductive transmission device. The flow then proceeds to block 303 where one or more triangular coil elements of the device proximate to the electronic device(s) detect proximity of the electronic device(s). Such detection may be performed by monitoring current of the triangular coil elements, monitoring information exchanged between the electronic device and an electronic device incorporating the triangular coil elements whether exchanged utilizing the triangular coil elements and/or other communication components, and/or any other such means of determining when triangular coil elements are proximate to one or more electronic devices.

Next, the flow proceeds to block 304 where power is inductively transmitted to the electronic device(s) using the proximate triangular coil element(s).

In some cases, multiple triangular coil elements may transmit power to multiple electronic devices. In such cases, the different triangular coil elements may utilize different inductive transmission parameters. Such may be tuned to the parameters of the respective electronic devices. In various cases, multiple triangular coil elements may transmit power to the same electronic device. In such cases, the multiple triangular coil elements may utilize the same parameters (which may be synchronized, complementary, and so on) and/or may alternate according to one or more alternation schemes.

Although the method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described above as inductively transmitting power from the proximate triangular coil elements to the electronic device(s). However, in various implementations power may be inductively transmitted from the electronic device(s) to the proximate triangular coil elements and/or between both the electronic device(s) and the proximate triangular coil elements.

By way of a second example, the method 300 is illustrated and described above as detecting proximate electronic device(s) and then inductively transmitting power. However, in various implementations it may be determined whether or not proximate electronic device(s) are detected. In such implementations, power may only be inductively transmitted if electronic device(s) are determined to be proximate.

By way of a third example, the method 300 is illustrated and described above as inductively transmitting power from the proximate triangular coil elements to the electronic device(s), simultaneous transmissions involving different triangular coil elements may be performed with different inductive power transmission characteristics such as different frequencies, power levels, and/or other such characteristics. For example, if two triangular coil elements are inductively transmitting power at the same time, the first triangular coil element may inductively transmit power at a first frequency and the second triangular coil element may inductively transmit power at a second frequency. In this way, cross coupling and/or other interference may be mitigated, minimized, and/or eliminated.

As described above and illustrated in the accompanying figures, the present disclosure discloses systems, apparatuses, and methods for inductive power transmission. A system for inductive power transmission may include at least one interface surface and a plurality of triangular coil elements, which may be equilateral triangles, positioned underneath the interface surface. Each of the triangular coil elements may be positioned such that at least one edge of the respective triangular coil element is adjacent to an edge of at least one other of the triangular coil elements. In some cases, at least one of the triangular coil elements may be positioned such that each of its edges are adjacent to edges of other triangular coil elements. Each of the plurality of triangular coil elements may be operable to inductively transmit power to at least one coil of at least one electronic device and/or inductively receive power from the coil of the electronic device. In this way, the triangular coil elements may be positioned to maximize the area underneath the interface surface.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Methods based on techniques of the described disclosure may be provided as a computer program product, or software, that may include a non-transitory machine-readable medium having stored thereon instructions, which may be used to program a computer system (or other electronic devices) to perform a process according to the present disclosure. A nontransitory machine-readable medium includes any mechanism for storing information in a form (e.g., software, processing application) readable by a machine (e.g., a computer). The nontransitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for inductive power transmission, comprising:
   an interface surface; and
   a plurality of coil elements positioned underneath the interface surface, each of the plurality of coil elements positioned such that at least one edge of the respective coil element is adjacent to an edge of at least one other of the plurality of coil elements, wherein each of the plurality of coil elements includes a ferrite shielding element positioned around sides of the respective coil element to separate the respective coil element from adjacent coil elements;
   wherein each of the plurality of coil elements are operable to at least one of: inductively transmit power to at least one coil of at least one electronic device; or inductively receive power from the at least one coil of the at least one electronic device.

2. The system of claim 1, wherein each of the plurality of coil elements is triangular.

3. The system of claim 1, wherein the ferrite shielding element is further configured to shield a surface of the respective coil element opposite the interface surface.

4. The system of claim 1, wherein the at least one ferrite shielding element reduces interference between at least two of the plurality of coil elements inductively transmitting power at a same time.

5. The system of claim 1, wherein at least two of the plurality of coil elements are operable to cooperatively transmit power to the at least one coil of the at least one electronic device.

6. The system of claim 1, wherein the at least two of the plurality of coil elements transmit the power utilizing a matching set of inductive transmission parameters.

7. The system of claim 1, wherein a first of the plurality of coil elements is operable to inductively transmit power to the at least one coil of the at least one electronic device at a same time a second of the plurality of coil elements inductively transmits power to at least one additional coil of at least one additional electronic device.

8. The system of claim 7, wherein the first of the plurality of coil elements inductively transmits power at a first frequency and the second of the plurality of coil elements inductively transmits power at a second frequency.

9. The system of claim 1, wherein each of the plurality of coil elements are operable to inductively transmit power at one of different frequencies or different power levels.

10. The system of claim 1, wherein at least one coil element of the plurality of coil elements is positioned such that each edge of the at least one coil is adjacent to an edge of another coil element.

11. The system of claim 1, wherein the interface surface forms an irregular shape or is a non-planar surface.

12. The system of claim 1, wherein each of the plurality of coil elements are operable to detect proximity of the at least one coil of the at least one electronic device.

13. The system of claim 12, wherein each of the plurality of coil elements are operable to inductively transmit power to the at least one coil of the at least one electronic device upon detecting that the at least one coil of the at least one electronic device is proximate.

14. The system of claim 1, wherein at least two of the plurality of coil elements occupy a different horizontal plane.

15. The system of claim 1, wherein the plurality of coil elements are positioned to occupy a maximized area underneath the interface surface.

16. The system of claim 1, wherein at least one of the plurality of coil elements is non-planar.

17. The system of claim 1, wherein each of the plurality of coil elements are operable to configure inductive power transmission according to requirements of a receiving device.

18. The system of claim 1, wherein at least two of the plurality of coil elements are operable to activate simultaneously.

19. The system of claim 18, wherein the at least two of the plurality of coil elements utilize either a matching set of inductive transmission parameters or differing sets of inductive transmission parameters.

20. The system of claim 1, further comprising at least one coil element that has a shape other than a triangle.

21. An electronic device, comprising:
   at least one interface surface; and
   a plurality of coil elements positioned underneath the at least one interface surface, each of the plurality of coil elements positioned such that at least one edge of the respective coil element is adjacent to an edge of at least one other of the plurality of coil elements, wherein each of the plurality of coil elements includes a ferrite shielding element positioned between the respective coil element and adjacent coil elements to separate the respective coil element from the adjacent coil elements;
   wherein
   at least one of the plurality of coil elements has a first shape;
   at least one of the plurality of coil elements has a second shape different than the first shape; and
   each of the plurality of coil elements are operable to at least one of:
      inductively transmit power to at least one coil of at least one electronic device; or inductively receive power from the at least one coil of the at least one electronic device.

22. The electronic device of claim 21, wherein:
   the first shape is flat; and
   the second shape is non-flat.

23. The electronic device of claim 21, wherein:
   the first shape is triangular; and
   the second shape is other than triangular.

24. A method for inductive power transmission, the method comprising:
   placing at least one electronic device on an interface surface of an inductive power transmission device, the inductive power transmission device including a plurality of triangular coil elements positioned underneath the interface surface, each of the plurality of triangular coil elements positioned such that at least one edge of the respective triangular coil element is adjacent to an edge of at least one other of the plurality of triangular coil elements, wherein each of the plurality of coil elements includes a ferrite shielding element positioned between the respective coil element and adjacent coil elements to separate the respective coil element from the adjacent coil elements;

detecting that at least one of the plurality of triangular coil elements is proximate to the at least one electronic device; and inductively transmitting power to the at least one electronic device utilizing the at least one of the plurality of triangular coil elements.

* * * * *